(12) United States Patent
Burr

(10) Patent No.: US 8,660,482 B2
(45) Date of Patent: Feb. 25, 2014

(54) BROADBAND SATELLITE WITH DUAL FREQUENCY CONVERSION AND BANDWIDTH AGGREGATION

(75) Inventor: Douglas G. Burr, San Jose, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 366 days.

(21) Appl. No.: 13/093,669

(22) Filed: Apr. 25, 2011

(65) Prior Publication Data

US 2012/0094593 A1    Apr. 19, 2012

Related U.S. Application Data

(60) Provisional application No. 61/393,228, filed on Oct. 14, 2010.

(51) Int. Cl.
    *H04B 7/185*    (2006.01)
(52) U.S. Cl.
    USPC .......... 455/12.1; 455/13.3; 455/428; 455/429
(58) Field of Classification Search
    USPC ....................................... 455/12.1
    See application file for complete search history.

(56) References Cited

U.S. PATENT DOCUMENTS

| | | | | |
|---|---|---|---|---|
| 6,157,812 | A * | 12/2000 | Sarraf ........................... | 455/13.4 |
| 6,175,719 | B1 * | 1/2001 | Sarraf et al. .................. | 455/13.1 |
| 6,574,794 | B1 * | 6/2003 | Sarraf ............................. | 725/63 |
| 6,665,518 | B1 * | 12/2003 | Courtney et al. ............ | 455/12.1 |
| 6,704,544 | B1 * | 3/2004 | Sarraf et al. .................. | 455/13.1 |
| 6,781,968 | B1 * | 8/2004 | Colella et al. ................. | 370/316 |
| 6,865,388 | B2 * | 3/2005 | Walsh et al. .................. | 455/428 |
| 6,879,829 | B2 * | 4/2005 | Dutta et al. ................... | 455/436 |
| 6,961,539 | B2 * | 11/2005 | Schweinhart et al. ....... | 455/12.1 |
| 7,024,158 | B2 * | 4/2006 | Wiswell ....................... | 455/12.1 |
| 7,088,951 | B2 * | 8/2006 | Kato ............................. | 455/3.02 |
| 7,302,226 | B2 * | 11/2007 | Stephenson .................. | 455/12.1 |
| 7,505,736 | B2 * | 3/2009 | Min ............................... | 455/12.1 |
| 7,526,249 | B2 * | 4/2009 | Waltman et al. ............. | 455/12.1 |
| 7,869,759 | B2 * | 1/2011 | Pateros et al. ................ | 455/12.1 |
| 7,869,802 | B2 * | 1/2011 | Fenech et al. ................ | 455/427 |
| 7,925,208 | B2 * | 4/2011 | Sarraf et al. ................. | 455/12.1 |
| 8,077,760 | B2 * | 12/2011 | Chen ............................. | 375/211 |
| 8,107,368 | B2 * | 1/2012 | Connors et al. .............. | 370/230 |
| 8,107,410 | B2 * | 1/2012 | Connors et al. .............. | 370/316 |
| 8,111,646 | B1 * | 2/2012 | Chang .......................... | 370/316 |
| 8,135,338 | B1 * | 3/2012 | Gelon et al. .................. | 455/13.1 |
| 8,144,643 | B2 * | 3/2012 | Miller et al. .................. | 370/321 |
| 8,218,473 | B2 * | 7/2012 | Connors et al. .............. | 370/316 |

(Continued)

*Primary Examiner* — Hai V Nguyen
(74) *Attorney, Agent, or Firm* — Weaver Austin Villeneuve & Sampson LLP

(57) ABSTRACT

A broadband satellite having a payload subsystem configured to provide dual frequency conversion and bandwidth aggregation is communicatively coupled (i) to at least one gateway by a feeder link operating at a first frequency band; and (ii) to a plurality of user terminals by user links operating at a second frequency band. The payload subsystem has a first and a second frequency converter a satellite feeder link antenna feed, and a satellite user link antenna feed. The first frequency converter down converts, to a third frequency band, as an aggregated block, signals received at the satellite feeder link antenna feed from the gateway via the feeder link. The third frequency band is substantially lower than both the first and second frequency band. The down converted signals are routed to the second frequency converter for up converting to the second frequency band for transmission over the user link to the user terminals.

35 Claims, 5 Drawing Sheets

(56) References Cited

U.S. PATENT DOCUMENTS

| | | | |
|---|---|---|---|
| 8,218,476 B2 * | 7/2012 | Miller | 370/321 |
| 8,238,819 B2 * | 8/2012 | Karabinis | 455/12.1 |
| 8,270,898 B2 * | 9/2012 | Karabinis et al. | 455/12.1 |
| 8,270,900 B2 * | 9/2012 | Parkman et al. | 455/13.4 |
| 8,358,971 B2 * | 1/2013 | Schiff | 455/12.1 |
| 8,385,855 B2 * | 2/2013 | Lorg et al. | 455/118 |
| 2003/0032391 A1 * | 2/2003 | Schweinhart et al. | 455/12.1 |
| 2003/0032427 A1 * | 2/2003 | Walsh et al. | 455/428 |
| 2003/0134635 A1 * | 7/2003 | Lane et al. | 455/428 |
| 2003/0217362 A1 * | 11/2003 | Summers et al. | 725/63 |
| 2004/0166801 A1 * | 8/2004 | Sharon et al. | 455/12.1 |
| 2006/0040612 A1 * | 2/2006 | Min | 455/12.1 |
| 2007/0155318 A1 * | 7/2007 | Monte et al. | 455/12.1 |
| 2009/0298423 A1 * | 12/2009 | Dankberg et al. | 455/12.1 |
| 2009/0309801 A1 * | 12/2009 | Rao et al. | 343/779 |
| 2010/0023972 A1 * | 1/2010 | Summers et al. | 725/54 |
| 2010/0117693 A1 * | 5/2010 | Lorg et al. | 327/156 |
| 2010/0238082 A1 * | 9/2010 | Kits van Heyningen et al. | 343/761 |
| 2010/0319035 A1 * | 12/2010 | Shah et al. | 725/70 |
| 2011/0012801 A1 * | 1/2011 | Monte et al. | 343/762 |
| 2011/0032173 A1 * | 2/2011 | Chang et al. | 343/880 |
| 2011/0044236 A1 * | 2/2011 | Giffin et al. | 370/316 |
| 2011/0068988 A1 * | 3/2011 | Monte | 343/761 |
| 2011/0268017 A1 * | 11/2011 | Miller | 370/321 |
| 2011/0268158 A1 * | 11/2011 | Miller et al. | 375/138 |
| 2012/0020280 A1 * | 1/2012 | Jansson et al. | 370/316 |
| 2012/0068019 A1 * | 3/2012 | Boccio et al. | 244/172.6 |

\* cited by examiner

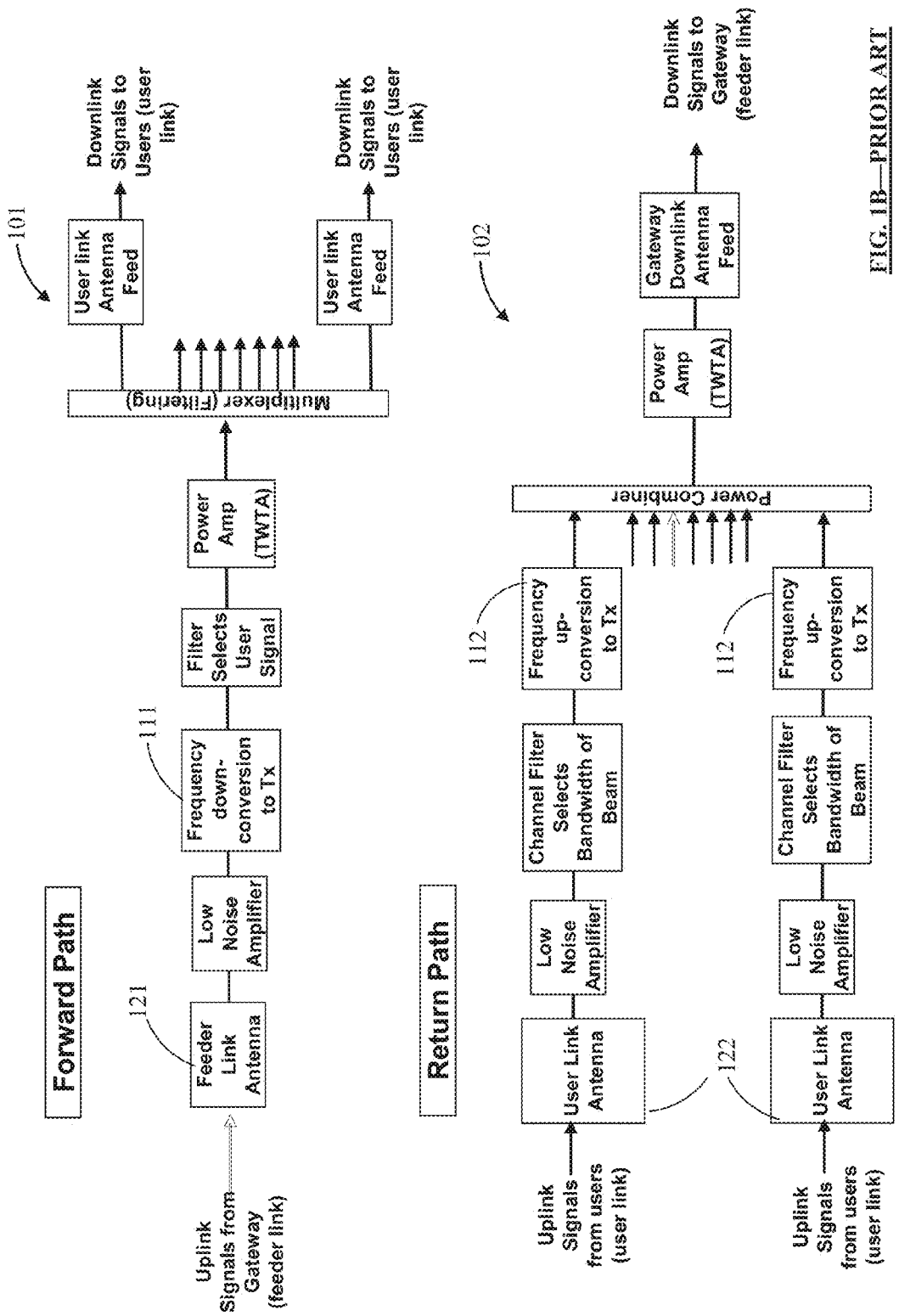
FIG. 1B—PRIOR ART

BROADBAND SATELLITE WITH DUAL FREQUENCY CONVERSION AND BANDWIDTH AGGREGATION

CROSS-REFERENCE TO RELATED APPLICATION

The present patent application claims the priority benefit of commonly owned U.S. provisional patent application 61/393,228, filed Oct. 14, 2010 entitled "Broadband Satellite with Dual Frequency Conversion and Bandwidth Aggregation", which is hereby incorporated by reference in its entirety into the present patent application.

TECHNICAL FIELD

This invention relates generally to enabling high capacity broadband service from an Earth orbiting satellite, and particularly to a payload architecture for such satellite featuring dual frequency conversion and bandwidth aggregation.

BACKGROUND OF THE INVENTION

The assignee of the present invention manufactures and deploys spacecraft for, inter alia, communications and broadcast services. Market demands for such spacecraft have imposed increasingly stringent requirements on spacecraft payloads. For example, broadband service providers desire spacecraft with increased data rate capacity at higher EIRP through each of an increased number of user spot beams.

To meet the more stringent demands, a spacecraft capable of providing at least 200 Gbps total data bandwidth distributed across at least one hundred spot beams is desirable. A payload architecture appropriate to such a demand may be required to accommodate feeder links at Q or V band frequencies (33-75 GHz) and user links at Ka band (17-31 GHz). The payload, desirably, should provide an aggregate effective isotropic radiated power (EIRP) in the forward direction of greater than 80 dBw. Meeting the foregoing performance objectives with a conventional payload architecture implies the use of a complex and heavy network of payload interconnection hardware.

Thus, there is a need for a high power broadband spacecraft with an improved payload architecture.

SUMMARY OF INVENTION

The present inventor has recognized that a satellite payload architecture providing dual frequency conversion and/or bandwidth aggregation significantly lowers mass per unit bandwidth relative to conventional architectures. In an embodiment, a high capacity Ka band communications user link consists of a large number of small spot user antenna beams ("user spot beams"), communicatively coupled, on board the satellite, to a feeder link consisting of a smaller number of gateway antenna beams. In an embodiment, the feeder link operates in the Q and/or V bands and accommodates substantially more bandwidth than any single user spot beam. The gateway antenna beam may carry aggregated signals for distribution to any of the large number of user spot beams. In an embodiment, feeder link signals received at a satellite feeder link antenna feed array are amplified and down converted on the satellite as a block, to an intermediate frequency band well below Ka band. Advantageously, the down conversion is performed proximate to the satellite feeder link antenna feed array. The aggregated, down-converted signals may then be routed, at the intermediate frequency, through the satellite and processed for transmission by a satellite user link antenna feed array over the user link. Prior to transmission over the user link, the aggregated, down-converted signals are up-converted to Ka band. Advantageously, the up-conversion is performed proximate to the satellite user link antenna feed array. In an embodiment, intermediate frequency signals may be distributed, filtered and up-converted to Ka band prior to high power amplification. The amplified signals may then be connected via waveguide to the individual user beam downlink feed elements of the user link antenna feed array.

In an embodiment, the user to gateway return path is also routed at a lower intermediate frequency after amplification, down conversion and aggregation near the user uplink beam feed cluster.

In an embodiment, a satellite has a payload subsystem having a first frequency converter, a second frequency converter, a satellite feeder link antenna feed, and a satellite user link antenna feed. The payload subsystem may be communicatively coupled (i) to at least one gateway by a feeder link operating at a first frequency band; and (ii) to a plurality of user terminals by a user link operating at a second frequency band. The first frequency converter may downconvert, to a third frequency band, as an aggregated block, signals received at the satellite feeder link antenna feed from the gateway via the feeder link, with the third frequency band being substantially lower than the first frequency band and the second frequency band. The downconverted signals may be processed by the payload subsystem and routed to the second frequency converter. The second frequency converter may upconvert the downconverted signals to the second frequency band for transmission by the satellite user link antenna feed over the user link to the user terminals.

In another embodiment, the payload subsystem has third frequency converter and a fourth frequency converter. The third frequency converter may downconvert, to a sub-band of the third frequency band, return path signals received at the satellite user link antenna feed from users via the user link. The downconverted return path signals may be processed by the payload subsystem and routed to the fourth frequency converter. The fourth frequency converter may upconvert the down converted return path signals, to a fourth frequency band for transmission by the satellite feeder link antenna feed over the feeder link to the gateway.

In a further embodiment, the first frequency converter may be proximate to the satellite feeder link antenna feed array, and the second frequency converter is proximate to the satellite user link antenna feed array.

In a another embodiment the user link may comprises at least 100 Ka-band spot user antenna beams.

In a still further embodiment, the user link comprises at least 250 Ka-band spot user antenna beams.

In an embodiment, the spot user antenna beams may be arranged to provide contiguous coverage of an area on the Earth. The area on the Earth may comprise approximately half of the continental United States.

In another embodiment, the feeder link may operate within at least one of V-band and Q-band. The satellite may receive forward uplink signals transmitted by the gateway at V-band, where the forward uplink signals have bandwidth aggregated at the gateway for transmission to users.

In an embodiment, the satellite may receive signals transmitted by multiple users, located within a user beam at Ka-band. The received signals may be aggregated within a user beam feed cluster and the aggregated received signals may be routed, at the third frequency band, from a location proximate to the satellite user link antenna feed array to a location proximate to the satellite feeder link antenna feed array.

In another embodiment, the aggregated received signals comprise a bandwidth of approximately 4 GHz.

In an embodiment, the third frequency band may be at X band. The third frequency band may be within the range of approximately 4 to 10 GHz.

In another embodiment, a single antenna reflector may be substantially dedicated to the feeder link. At least one reflector antenna may be substantially dedicated to the user link.

In an embodiment, the user link may be configured to provide a total forward data capacity of over 300 Gb/sec.

In another embodiment, service to small user terminals is enabled, for example terminals having an antenna diameter no greater than one meter are operable with system.

In an embodiment, a system includes a satellite, a gateway, and a user terminal; the satellite having a first frequency converter, a second frequency converter, a satellite feeder link antenna feed, and a satellite user link antenna feed. The payload subsystem may be communicatively coupled (i) to at least one gateway by a feeder link operating at a first frequency band; and (ii) to a plurality of user terminals by a user link operating at a second frequency band. The first frequency converter may downconvert, to a third frequency band, as an aggregated block, signals received at the satellite feeder link antenna feed from the gateway via the feeder link, with the third frequency band being substantially lower than the first frequency band and the second frequency band. The downconverted signals may be processed by the payload subsystem and routed to the second frequency converter. The second frequency converter may upconvert the downconverted signals to the second frequency band for transmission by the satellite user link antenna feed over the user link to the user terminals.

BRIEF DESCRIPTION OF THE DRAWINGS

Features of the invention are more fully disclosed in the following detailed description of the preferred embodiments, reference being had to the accompanying drawings, in which:

FIG. 1B illustrates a prior art approach to a satellite payload architecture.

Figure 1A:
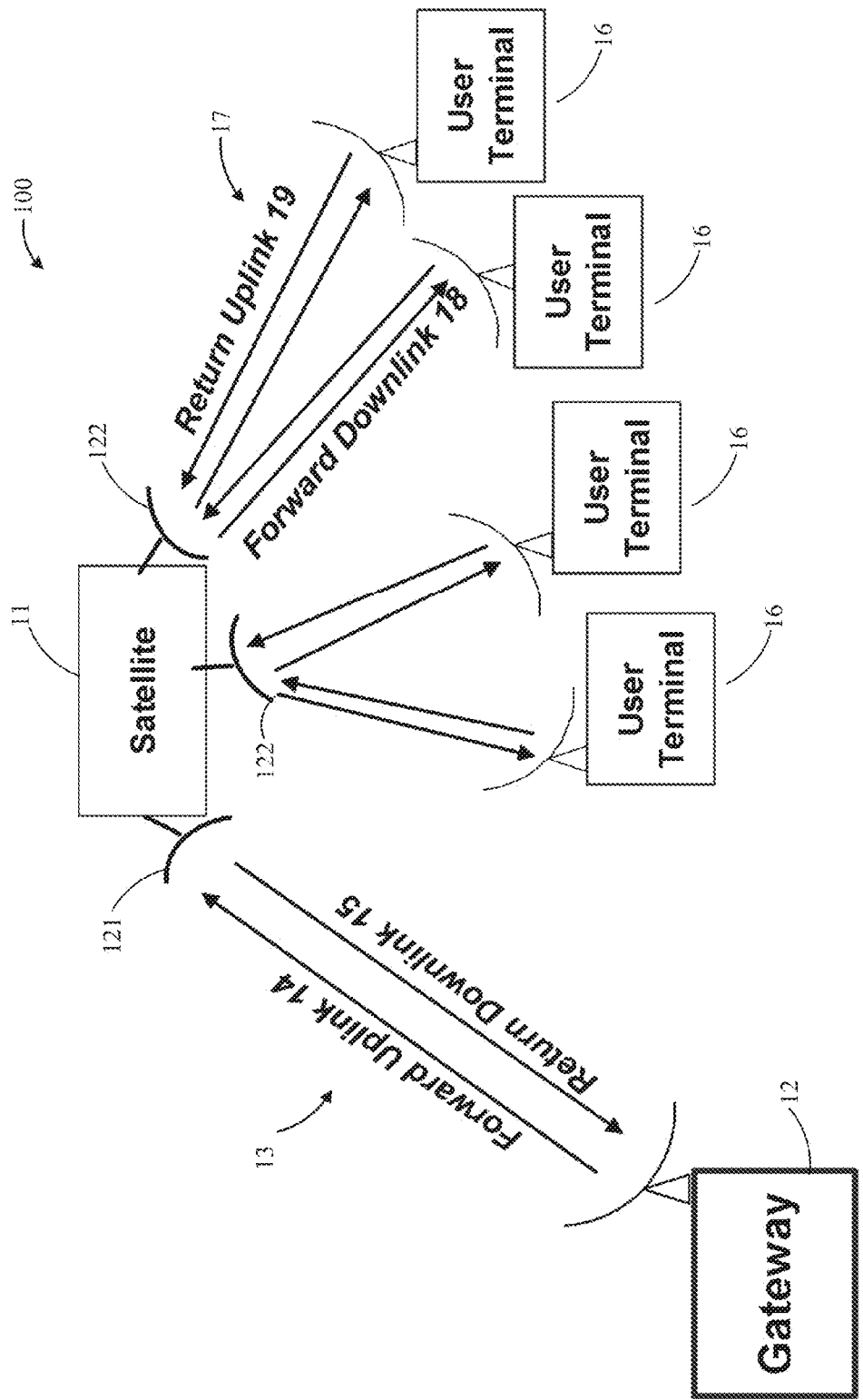
FIG. 1A illustrates a known satellite communications network.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

In an embodiment, a high capacity broadband service from an Earth orbiting satellite is provided by a payload subsystem that performs dual frequency conversion and bandwidth aggregation on board the satellite. A better understanding of the terms "dual frequency conversion" and "bandwidth aggregation", as the terms are used herein, may be realized by first referring to FIG. 1A and FIG. 1B.

In FIG. 1A, a simplified diagram of a conventional satellite communications network 100 is illustrated. The network includes a satellite 11, which may be located, for example, at a geostationary orbital location. Satellite 11 may be communicatively coupled, via at least one feeder link antenna 121, to at least one gateway 12 and, via at least one user link antenna 122 to a plurality of user terminals 16. The at least one gateway 12 may be coupled to a network such as, for example, the Internet. Each gateway 12 and the satellite 11 communicate over a feeder link 13, which has both a forward uplink 14 and a return downlink 15. Feeder link 13 may operate for example, in an assigned frequency band between 17 and 80 GHz.

User terminals 16 and the satellite 11 communicate over a user link 17 that has both a forward downlink 18 and a return uplink 19. User link 17 may operate in an assigned frequency band lower than the frequency assigned to feeder link 13. For example, user link 17 may operate at Ka band (17-31 GHz).

Satellite 11 will ordinarily include a payload subsystem for, inter alia, processing signals traveling between gateway 12 and user terminals 16. Referring now to FIG. 1B, a simplified block diagram of a satellite payload subsystem of the prior art is illustrated. In a forward path 101, a single frequency down conversion 111 converts forward path signals from the feeder uplink band directly to the lower frequency user downlink band. Similarly, referring now to return path 102, a single frequency up conversion 112 per user beam converts the return path signals from the user uplink band directly to the higher frequency feeder downlink band.

Since one transmission line per user spot beam is required to route the signals between the feeder link antenna and the user link antenna, and well over one hundred user spot beams are desirable, the mass of radio frequency transmission lines used to connect the payload components together can be very significant. These radio frequency transmission lines, consisting, for example, of coaxial cables and waveguides, together with ancillary connectors and support structure can represent more than 60% of the payload component mass as well as impose a significant cost and complexity burden on the payload subsystem. The present inventor has recognized that these detrimental features may be substantially mitigated by embodiments of a broadband satellite with dual frequency conversion and bandwidth aggregation, as described hereinbelow.

Figure 2:
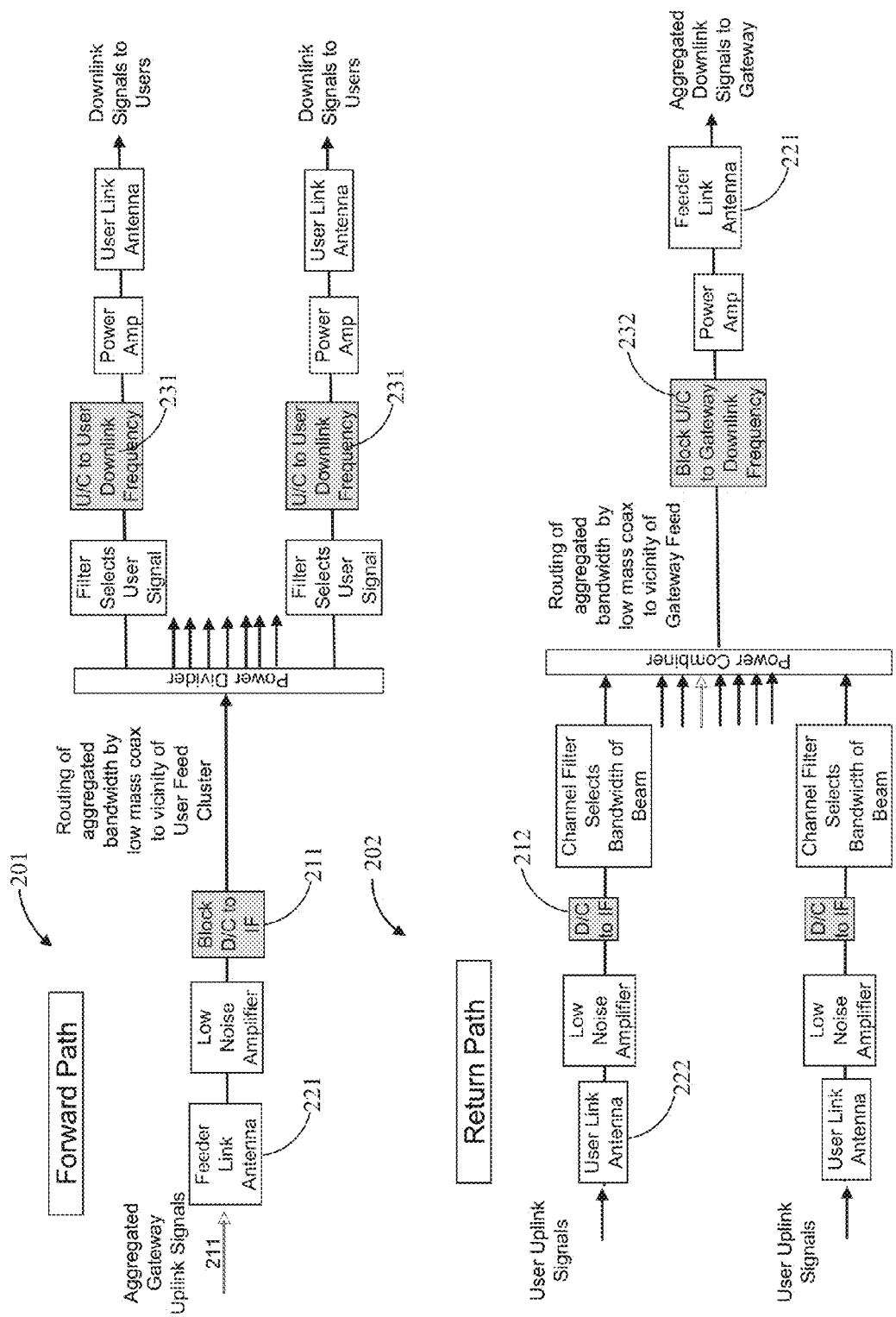
FIG. 2 illustrates an embodiment wherein a payload architecture features bandwidth aggregation and dual frequency conversion.

Referring now to FIG. 2, in an embodiment, data processed via forward path 201 may consist of data for each of a plurality of user spot beams, modulated onto carriers at the gateway, and aggregated. The resulting aggregated gateway uplink signals 211 may, advantageously, utilize the entire spectrum allocated to the feeder uplink. For example, for a V band or Q band feeder link, 4 GHz of bandwidth may be filled. The aggregated gateway uplink signals may then be received at the spacecraft by feeder link antenna 221.

Advantageously, the feeder link may operate at V-band, to provide increased bandwidth relative to the bandwidth available to a Ka-band feeder link, and to avoid a requirement for spatial isolation between gateways and user beams.

At the spacecraft, the aggregated forward path data may be block down converted 211 to an intermediate frequency (IF). In an embodiment, the IF may be a substantially lower frequency than the frequency assigned to the user link. Advantageously, for example, the IF may be in the X band. In an embodiment, the IF band is within the frequency range of 4.9 to 9.1 GHz. Following this down-conversion, the aggregated forward path data may be transported to the vicinity of the user spot beam antenna clusters. There, bandwidth for each individual user spot beam may be filtered out of the aggregate, up-converted 231 to the feeder link frequency (for example, Ka band), amplified and transmitted to a user via a user downlink antenna feed.

Referring still to FIG. 2, in an embodiment, data processed via return path 202 may consist of data received from individual users within a plurality of user spot beams. The data may be received by user link antenna 222, operating at a user link frequency within, for example, a segment of Ka-band allocated to return uplink 19. The received signals may be amplified and down converted 212 to a specific IF sub-band within, for example, the X band. In an embodiment, the down-converted signals may be filtered to exclude signals in other sub-bands. Advantageously, IF signals from multiple nearby spot beam feeds (belonging to the same feed cluster) in different IF sub-bands may be aggregated (power summed) to produce an IF bandwidth equal to a total bandwidth allocated to return downlink 15. In an embodiment, the allocated bandwidth may be within the Q band and/or V band. Advantageously, the aggregated IF signals may be transported via coax to an up-converter 232 proximate to an antenna feed for the return down link. Up-converter 232 may block up convert the aggregated IF signals to the Q band. The up-converted signals may then be amplified and transmitted to gateway 12 via feeder link antenna 221.

Figure 3:
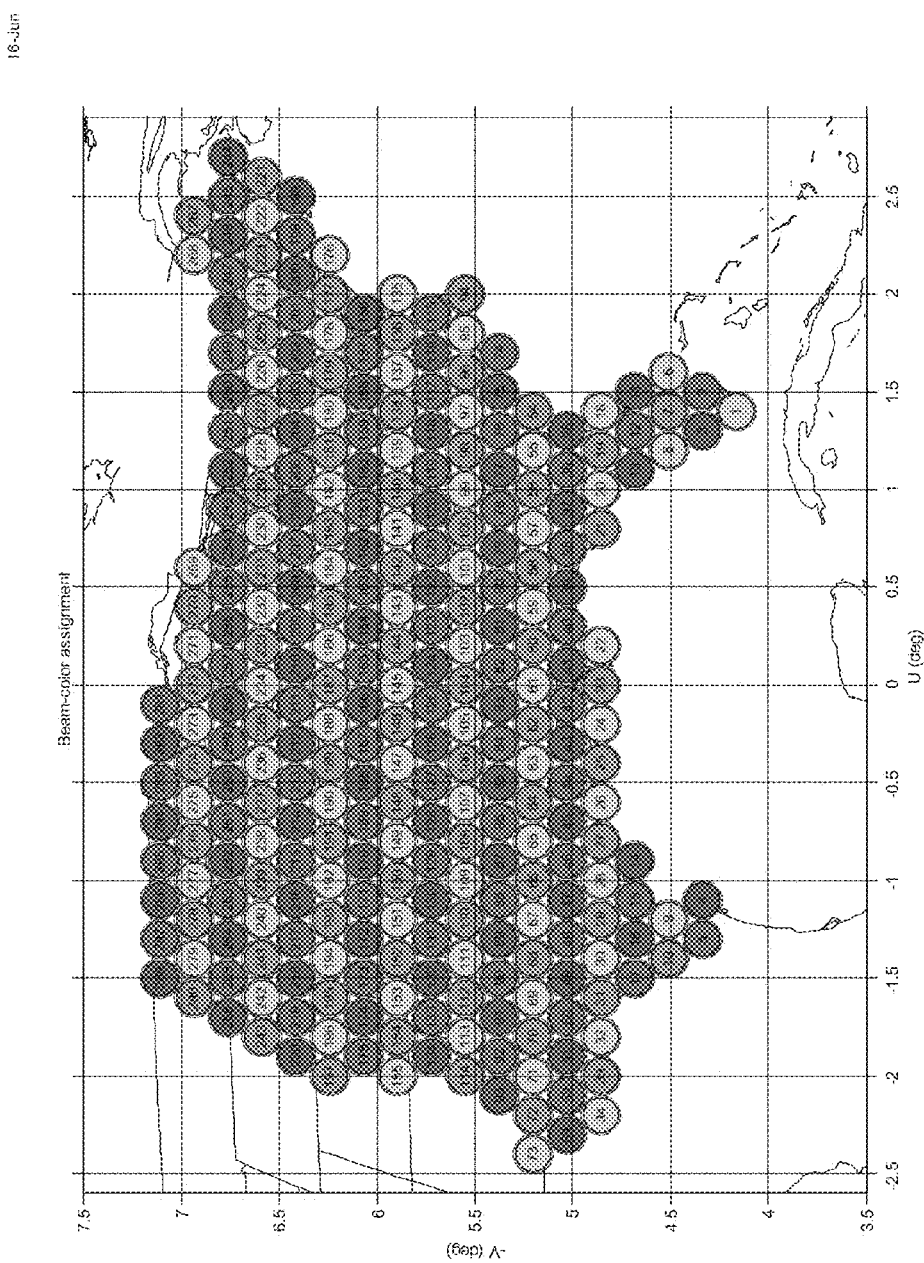
FIG. 3 illustrates a user spot beam coverage pattern according to an embodiment.

A high capacity broadband satellite may advantageously have a payload subsystem that performs dual signal conversion and bandwidth aggregation on board the satellite as described hereinabove. Advantageously, such a satellite may provide at least 200 Gbps total data bandwidth distributed across at least one hundred user spot beams. In an embodiment, at least two hundred eighty eight (288) user spot beams may be provided. Advantageously, the user spot beams may be approximately 0.2 degrees in diameter and distributed in a triangular lattice as illustrated in FIG. 3 so as to provide coverage to, for example, approximately half the continental United States. Advantageously, data rates of over 1 Gb/sec/beam may be provided to conventional user terminals, using 500 MHz of spectrum per beam, for a total forward data capacity of over 300 Gb/sec. The inventor has found, for example, that embodiments of the present invention may provide the above mentioned data capacity when used in conjunction with commercially available user terminals having a diameter not greater than one meter.

Figure 4:
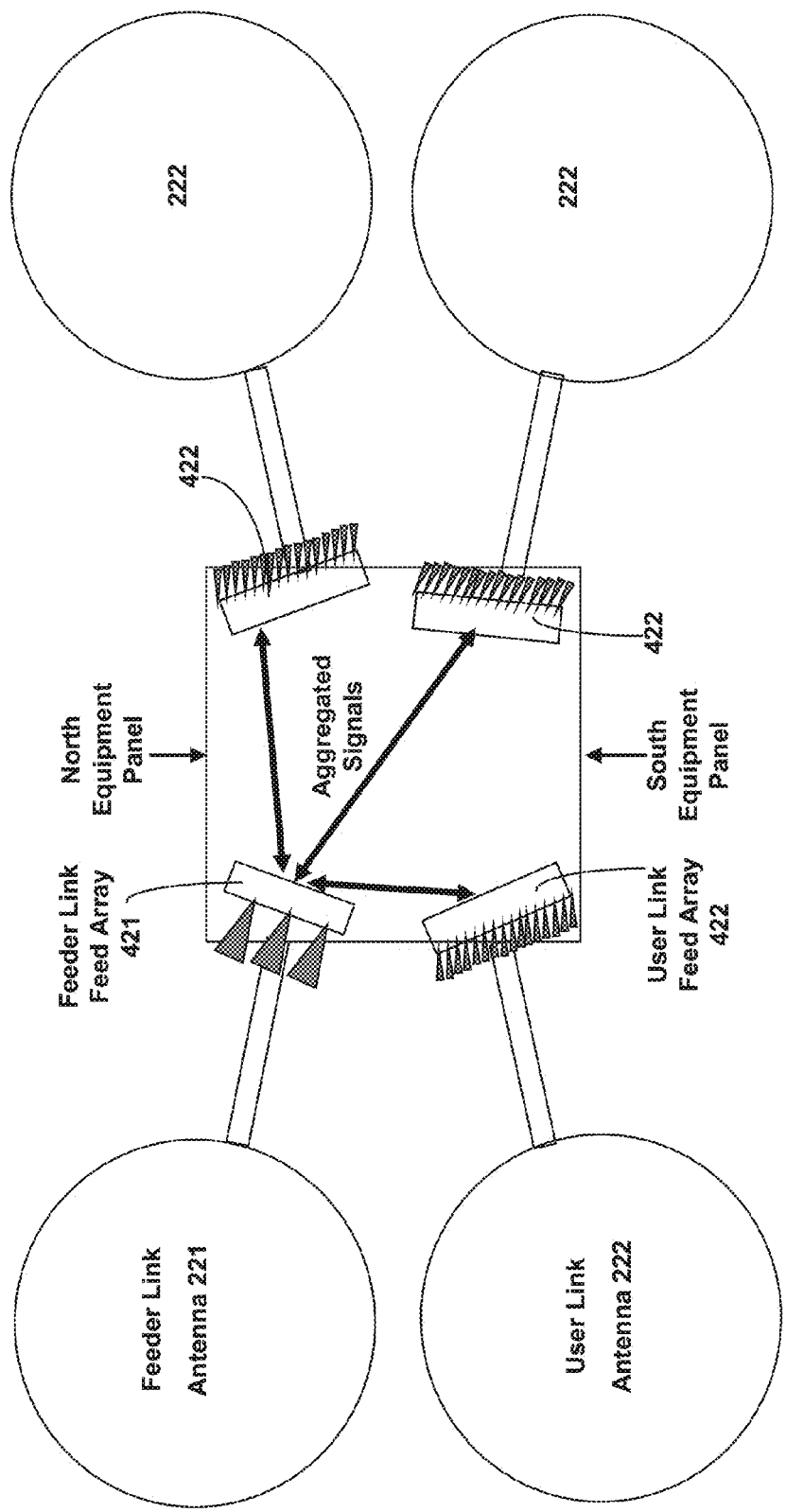
FIG. 4 illustrates a satellite payload block diagram of an embodiment.

Referring now to FIG. 4, an embodiment is illustrated wherein a high capacity broadband satellite has one feeder link antenna 221 and three user link antennas 222. Advantageously, a reflector associated with each respective antenna may have a diameter of 3-5 meters. Each reflector may be illuminated by a feed array, each feed array consisting of a number of individual feed elements. In an embodiment, feeder link antenna 221 may be illuminated by feeder link feed array 421 having, for example, eighteen (18) feed elements. Advantageously, each feeder link feed element may be associated with a respective gateway and may be configured to handle sixteen (16) communication channels of 250 MHz bandwidth per channel at each of two polarizations. In an embodiment, each user link antenna 222 may be illuminated by a respective user link feed array 422 having, for example, ninety six (96) feed elements. Advantageously, each feed element may be associated with a single user spot beam and may be configured to handle two 250 MHz bandwidth communications channels. Collectively, two hundred eighty eight (288) user spot beams may be provided by the above described configuration. Such a configuration is capable of providing a desirable broadband data capacity of approximately 300 Gb/sec (2.1 b/s/Hz*500 MHz per spot beam*288 spot beams).

In an embodiment, a separate, dedicated, reflector may be provided for the feeder link. Advantageously, gateway geographic locations may be selected without regard to user spot beam pattern. For example, a gateway may be located within a user beam cluster. Advantageously, a boresight location of the dedicated feeder link reflector may be optimized for low scan loss and scan distortion independent of user spot beam locations.

Referring still to FIG. 4, in accordance with an embodiment, forward path signals may undergo block down conversion to intermediate frequency proximate to feeder link feed array 421. Resulting aggregated, down-converted signals may be routed through the spacecraft by a number of coax cables having a particular specific mass. For example, assuming the configuration described in the immediately preceding paragraph, the forward path signals may be routed to an up-converter proximate to user link feed arrays 422 by thirty six cables having a diameter of 0.141 inches, and a specific mass of 0.011 kg per foot. Assuming an average run length per cable of twenty feet, the mass of forward path coax cables in the above described embodiment may be approximately 8 kg.

In the absence of the present teachings, and referring now to FIG. 1B, forward path signals would undergo frequency down conversion to Tx 111 and be routed to user link antenna feed 101 by two hundred eighty eight cables having a diameter of 0.190 inches and a specific mass of 0.017 kg per foot. Assuming, again, an average run length per cable of twenty feet, the mass of forward path coax cables for such an approach would be approximately 98 kg.

In the foregoing example, mass savings result both from bandwidth aggregation, resulting in fewer required coax cables, and from dual frequency conversion to IF, resulting in a lower coax cable specific mass. In some embodiments, dual frequency conversion may be employed without bandwidth aggregation; likewise, bandwidth aggregation is used in some embodiments without dual frequency conversion.

In an embodiment, the spot user antenna beams are powered by traveling wave tube amplifiers (TWTA's). For example, 72 active TWTAs, each driving a four channel reverse output multiplexer, may be required to provide 288 spot user antenna beams.

In another embodiment, each spot user antenna beam may be powered by a dedicated solid state power amplifier SSPA. Advantageously, a gallium nitride SSPA may power each spot user antenna beam, permitting the avoidance of TWTA's and reverse output multiplexers.

Thus, a high capacity broadband satellite having a bandwidth aggregation and dual frequency conversion has been disclosed.

The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A satellite, comprising
   a payload subsystem comprising a first frequency converter, a second frequency converter, a satellite feeder link antenna feed, and a satellite user link antenna feed, said payload subsystem being communicatively coupled (i) to at least one gateway by a feeder link operating at a first frequency band; and (ii) to a plurality of user terminals by a user link operating at a second frequency band, wherein:
   the first frequency converter downconverts, to a third frequency band, as an aggregated block, signals received at the satellite feeder link antenna feed from the gateway via the feeder link, said third frequency band being substantially lower than the first frequency band and the second frequency band;
   the downconverted signals are processed by the payload subsystem and routed to the second frequency converter; and
   the second frequency converter upconverts the downconverted signals to the second frequency band for transmission by the satellite user link antenna feed over the user link to the user terminals;
   the first frequency converter is proximate to the satellite feeder link antenna feed array;
   the second frequency converter is proximate to the satellite user link antenna feed array; and
   the received signals are aggregated within a user beam feed cluster and the aggregated received signals are routed, at the third frequency band, from a location proximate to the satellite user link antenna feed array to a location proximate to the satellite feeder link antenna feed array.

2. The satellite of claim 1, further comprising third frequency converter and a fourth frequency converter, wherein:
   the third frequency converter downconverts, to a sub-band of the third frequency band, return path signals received at the satellite user link antenna feed from users via the user link;
   the downconverted return path signals are processed by the payload subsystem and routed to the fourth frequency converter; and
   the fourth frequency converter upconverts the down converted return path signals, to a fourth frequency band for transmission by the satellite feeder link antenna feed over the feeder link to the gateway.

3. The satellite of claim 2, wherein the satellite receives signals transmitted by multiple users, located within a user beam at Ka-band.

4. The satellite of claim 3, wherein the received signals are aggregated within a user beam feed cluster and the aggregated received signals are routed, at the third frequency band, from a location proximate to the satellite user link antenna feed array to a location proximate to the satellite feeder link antenna feed array.

5. The satellite of claim 4, wherein the aggregated received signals comprise a bandwidth of approximately 4 GHz.

6. The satellite of claim 1, wherein the first frequency converter is proximate to the satellite feeder link antenna feed array.

7. The satellite of claim 1, wherein the second frequency converter is proximate to the satellite user link antenna feed array.

8. The satellite of claim 1, wherein the user link comprises at least 100 Ka-band spot user antenna beams.

9. The satellite of claim 1, wherein the user link comprises at least 250 Ka-band spot user antenna beams.

10. The satellite of claim 1, wherein the spot user antenna beams are arranged to provide contiguous coverage of an area on the Earth.

11. The satellite of claim 10, wherein the area on the Earth comprises approximately half of the continental United States.

12. The satellite of claim 1, wherein the feeder link operates within at least one of V-band and Q-band.

13. The satellite of claim 1, wherein the satellite receives forward uplink signals transmitted by the gateway at V-band, said forward uplink signals comprising bandwidth aggregated at the gateway for transmission to users.

14. The satellite of claim 1, wherein third frequency band is at X band.

15. The satellite of claim 1, wherein third frequency band is within the range of approximately 4 to 10 GHz.

16. The satellite of claim 1, wherein a single antenna reflector is substantially dedicated to the feeder link.

17. The satellite of claim 16, wherein at least one reflector antenna is substantially dedicated to the user link.

18. The satellite of claim 1, wherein the user link is configured to provide a total forward data capacity of over 300 Gb/sec.

19. The satellite of claim 18, wherein at least one user terminal has a diameter no greater than one meter.

20. A system, said system comprising:
   a satellite, a gateway, and a user terminal; the satellite comprising:
   a payload subsystem comprising a first frequency converter, a second frequency converter, a satellite feeder link antenna feed, and a satellite user link antenna feed, said payload subsystem being communicatively coupled (i) to the gateway by a feeder link operating at a first frequency band; and (ii) to the user terminal by a user link operating at a second frequency band, wherein:
   the first frequency converter downconverts, to a third frequency band, as an aggregated block, signals received at the satellite feeder link antenna feed from the gateway via the feeder link, said third frequency band being substantially lower than the first frequency band and the second frequency band;
   the downconverted signals are processed by the payload subsystem and routed to the second frequency converter;
   the second frequency converter upconverts the downconverted signals to the second frequency band for transmission by the satellite user link antenna feed over the user link to the user terminal;

the first frequency converter is proximate to the satellite feeder link antenna feed array;

the second frequency converter is proximate to the satellite user link antenna feed array; and the received signals are aggregated within a user beam feed cluster and the aggregated received signals are routed, at the third frequency band, from a location proximate to the satellite user link antenna feed array to a location proximate to the satellite feeder link antenna feed array.

21. The system of claim 20, further comprising third frequency converter and a fourth frequency converter, wherein:

the third frequency converter downconverts, to a sub-band of the third frequency band, return path signals received at the satellite user link antenna feed from users via the user link;

the downconverted return path signals are processed by the payload subsystem and routed to the fourth frequency converter; and the fourth frequency converter upconverts the down converted return path signals, to a fourth frequency band for transmission by the satellite feeder link antenna feed over the feeder link to the gateway.

22. The system of claim 21, wherein the satellite receives signals transmitted by multiple users, located within a user beam at Ka-band.

23. The system of claim 22, wherein the aggregated received signals comprise a bandwidth of approximately 4 GHz.

24. The system of claim 20, wherein the user link comprises at least 100 Ka-band spot user antenna beams.

25. The system of claim 20, wherein the user link comprises at least 250 Ka-band spot user antenna beams.

26. The system of claim 20, wherein the spot user antenna beams are arranged to provide contiguous coverage of an area on the Earth.

27. The system of claim 26, wherein the area on the Earth comprises approximately half of the continental United States.

28. The system of claim 20, wherein the feeder link operates within at least one of V-band and Q-band.

29. The system of claim 20, wherein the satellite receives forward uplink signals transmitted by the gateway at V-band, said forward uplink signals comprising bandwidth aggregated at the gateway for transmission to users.

30. The system of claim 20, wherein third frequency band is at X band.

31. The system of claim 20, wherein third frequency band is within the range of approximately 4 to 10 GHz.

32. The system of claim 20, wherein a single antenna reflector is substantially dedicated to the feeder link.

33. The system of claim 32, wherein at least one reflector antenna is substantially dedicated to the user link.

34. The system of claim 20, wherein the user link is configured to provide a total forward data capacity of over 300 Gb/sec.

35. The system of claim 34, wherein at least one user terminal has a diameter no greater than one meter.

* * * * *